United States Patent
Lara-Curzio et al.

(10) Patent No.: US 6,322,889 B1
(45) Date of Patent: Nov. 27, 2001

(54) OXIDATION-RESISTANT INTERFACIAL COATING FOR FIBER-REINFORCED CERAMIC

(75) Inventors: Edgar Lara-Curzio; Karren L. More; Woo Y. Lee, all of Knoxville, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/296,286

(22) Filed: Apr. 22, 1999

Related U.S. Application Data

(60) Provisional application No. 60/082,762, filed on Apr. 23, 1998.

(51) Int. Cl.[7] .................................................... D02G 3/00
(52) U.S. Cl. ........................ 428/378; 428/380; 428/384; 428/389; 501/95.1; 501/95.2
(58) Field of Search .................................... 428/370, 378, 428/380, 384, 387, 389, 293.4; 501/94, 95.1, 95.2

(56) References Cited

U.S. PATENT DOCUMENTS 5,567,518 * 10/1996 Pejryd et al. ........................ 428/378
5,723,213 * 3/1998 Carpenter et al. ................... 428/336

* cited by examiner

Primary Examiner—Deborah Jones
Assistant Examiner—Jason de la Pena

(57) ABSTRACT

A ceramic-matrix composite having a multilayered interfacial coating adapted to protect the reinforcing fibers from long-term oxidation, while allowing these to bridge the wake of advancing cracks in the matrix, is provided by selectively mismatching materials within adjacent layers of the interfacial coating, the materials having different coefficients of thermal expansion so that a low toughness interface region is created to promote crack deflection either within an interior layer of the mismatched interfacial coating or between adjacent layers of the mismatched interfacial coating.

13 Claims, 8 Drawing Sheets

OXIDATION-RESISTANT INTERFACIAL COATING FOR FIBER-REINFORCED CERAMIC

This application claims benefit of Provisional Appln. 60/082,762 filed Apr. 23, 1998.

FIELD OF THE INVENTION

The present invention relates to fiber reinforced ceramic composites and more specifically to interfacial coatings for such composites.

BACKGROUND OF THE INVENTION

The U.S. government has a paid-up license in this invention and the right in limited circumstances to require the patent owner to license others on reasonable terms as provided for under the terms of Department of Energy contract number DE-AC05-96OR22464.

Over the last twenty years, the development of continuous fiber-reinforced ceramics (CFCCs) has been driven, to a large extent, by the promise of substantial economic and environmental benefits if these materials are used in advanced industrial applications. M. A. Karnitz, D. F. Craig and S. L. Richlen, "Continuous Fiber Ceramic Composites Program," *Am. Ceram. Soc. Bull.,* 70, 3 (1991) pp. 430–5.

Except for a few applications at "low temperature" when ceramics may offer superior chemical, wear, or electrical properties over conventional materials, the main attraction for using ceramic materials in industrial applications is their potential to retain strength at elevated temperatures in aggressive environments.

For example, the successful development and operation of advanced coal-fueled gas turbine technologies depends on the ability of filtration systems to clean fuel or combustion gas streams of particulates prior to these gases being passed through a turbine. R. R. Judkins, D. P. Stinton, R. G. Smith et al., "Development of Ceramic Composite Hot-Gas Filters," *Journal of Engineering for Gas Turbines and Power,* 118 (1996) pp. 495–499. Currently, CFCC filters are undergoing testing and demonstration throughout the world for application in pressurized fluidized-bed combustion (PFBC) and integrated gasification combined cycle (IGCC) power plants. R. R. Judkins, D. P. Stinton, R. G. Smith et al., "Development of Ceramic Composite Hot-Gas Filters," *Journal of Engineering for Gas Turbines and Power,* 118 (1996) pp. 495–499. In such applications, the filters are repeatedly cleaned by pulses of gases that impose thermal shocks on the filters, because the cleaning gas is typically at a much lower temperature than the gas being filtered. Therefore, CFCCs are preferred over monolithic ceramics because the former are tougher, have the potential of exhibiting a graceful, non-catastrophic mode of failure, and offer superior resistance to thermal shock.

The characteristics of the reinforcement/matrix interface in CFCCs are to a large extent, responsible for the adequate operation of the micromechanical mechanisms responsible for the tough behavior of these materials. These mechanisms are based on the debonding of the reinforcing fibers at the tip of an advancing matrix crack, on the bridging of the matrix crack by the reinforcing fibers, and on the pullout of the fibers in the wake of the matrix crack.

The best room temperature tensile behavior and toughness (as measured by the area under the tensile stress-strain curve) of CFCCs have been obtained with CFCCs reinforced with either carbon or SiC-based fibers, wherein the fibers are coated with a thin (0.1–0.5 $\mu$m) compliant layer of carbon or boron nitride known as an interfacial coating. However, the use of CFCCs with carbon or boron nitride interfacial coatings is limited because in many applications, such as in PFBCs, the CFCCs must remain stable in an oxidizing environment at elevated temperatures, and neither carbon nor boron nitride meet this requirement.

Although it is widely accepted that non-oxide CFCCs will not be used in designs that would subject the component to stresses larger than the so-called matrix cracking stress, accidental stress excursions beyond this stress invariably will occur and result in matrix cracking. Matrix cracks serve as avenues for the ingress of the environment to the interior of the composite, thereby leading to oxidation of the fiber coating, and in the case of non-oxide fibers, to oxidation of the fibers and ultimately failure of the composite. E. Lara-Curzio, "Stress-Rupture of Nicalon™/SiC Continuous Fiber Ceramic Composite in Air at 950° C.," *J. Am. Ceram. Soc.,* 80[12](1997) pp. 3268–3272.

As a result of these limitations, substantial efforts have been expended in recent years for functional interfacial coatings that would protect the fibers during composite processing, be thermochemically stable with the fibers, the matrix, and the service environment, and be capable of promoting the deflection of matrix cracks allowing for fiber debonding and sliding. Furthermore, these conditions should be fulfilled over the expected service life of the component, which in the case of filters, for example, is measured in tens of thousands of hours.

Prior art attempts to provide oxidation resistant fiber coatings include doping carbon and BN with various element to improve their oxidation resistance, R. A. Lowden, O. J. Schwartz, and K. L. More, "Improved Fiber Coatings for Nicalon™/SiC Composites," *Ceram. Eng. Proc.,* 14, [7–8] (1993) pp. 375–384; S. Jacques, A. Guette, F. Langlais and R. Naslain, "Preparation and Characterization of SiC/SiC Microcomposites with Composition Graded C(B) Interphase," *Key Eng. Mat,* 127, Part 1 & 2 (1997) pp. 543–50; A. W. Moore, H. Sayir, S. C. Farmer, and G. N. Morscher, "Improved Interface Coatings for SiC Fibers in Ceramic Composites," *Ceram. Eng. Sci. Proc.,* 16[4] (1995) pp. 409–416, the use of multilayered fiber coatings of carbon and SiC H. W. Carpenter, and J. W. Buhlen, "Fiber Coatings for Ceramic Matrix Composites," *Ceram. Eng. Sci. Proc.,* 13 [7–8] (1992) pp. 238–256; C. Droillard, Ph.D. Thesis, University of Bordeaux, France (1993); R. Naslain, "The Concept of Layered Interphases in SiC/SiC," *Ceram. Trans.* 58 (1995) pp. 23–39, easy-cleaving oxides (e.g. silicates that are high-temperature analogues of mica, $\beta$-alumina, magnetoplumbites), H. Beall, K. Chyung, S. B. Dawes, K. P. Gadkareer and S. N. Hoda, "Fiber-reinforced Composite Comprising Mica Matrix or Interlayer" U.S. Pat. No. 4,948, 758, Aug. 14, 1990; and M. K. Cinibulk, "Magnetoplumbite Compounds as Fiber Coating for Oxide-Oxide Composites," *Ceram. Eng. Sci. Proc.,* 15[5] (1994) pp. 721–728, low strength porous and pseudo-porous fiber coatings, H. W. Carpenter, and J. W. Buhlen, "Fiber Coatings for Ceramic Matrix Composites," *Ceram. Eng. Sci. Proc.,* 13[7–8] (1992) pp. 238–256; H. W. Carpenter, J. W. Bohlen, and W. S. Steffier, "Weak Frangible Fiber Coating with Unfilled Pores for Toughening Ceramic-Matrix Composites," U.S. Pat. No. 5,221,578, Jun. 22, 1993; R. S. Hay, "The Use of Solid-State Reactions with Volume Loss to Engineer Stress and Porosity into the Matrix-Fiber Interface of a Ceramic Composite," *Acta. Metall. Mater.,* 43, 9 (1995) pp. 3333–3347; L. U. J. T. Ogbuji, "A Porous Oxidation-Resistant Fiber Coating for CMC Interphase," *Ceram. Eng.*

Sci. Proc., 14 [4] (1995) pp. 497–505, fugitive layers that disappear during processing leaving a physical gap between within the interfacial coating T. Mah, K. Keller, T. A. Parthasarathy, and J. Guth, "Fugitive Interfacial Coating in Oxide/Oxide Composites: A Viability Study," Ceram. Eng. Sci. Proc., 12[9–10] (1991) pp. 1802–1815, and isotropic oxide interfacial coatings such as rare-earth orthophosphates, zirconia, scheelite, alumina, mullite, and tin dioxide, to list just a few, D. B. Marshall, J. B. Davis, P. E. D. Morgan, and J. R. Porter, "Interface Materials for Damage-Tolerant Oxide Composites," Key Eng. Mat, 127, Part 1 & 2 (1997) pp. 27–36; G. Cain, R. L. Cain, A Tye, P. Rian, M. H. Lewis and J. Gent, "Structure and Stability of Synthetic Interphases in CMCs," Key Eng. Mat, 127, Part 1 & 2 (1997) pp. 37–50; W. Y. Lee, E. Lara-Curzio and K. L. More, "Multilayered Multifunctional Oxide Coating Concept for Satisfying Complex Interface Materials Criteria in Ceramic Matrix Composites" J. Am. Ceram. Soc., 81[4] pp. 600–604 (1998); G. Razzell, Zirconia Interface Layers Applied to Single Crystal Alumina Fibers by PVD and CVD," Key Eng. Mat, 127, Part 1 & 2 (1997) pp. 551–8; B. Davis, J. P. A. Lofvander, A. G. Evans, E. Bischoff, and M. L. Emiliani, "Fiber Coating Concepts for Brittle Matrix Composites," J. Am. Ceram. Soc., 76[5] (1993) pp. 1249–1257; R. W. Goettler, S. Sambasivan, and V. Dravid, "Isotropic Complex Oxides as Fiber Coatings for Oxide-Oxide CFCC," Ceram. Eng. Sci. Proc., 18[3] (1997) pp. 279–286; S. Sambasivan, "Rb-Stabilized $\beta$-$Al_2O_3$ as an Interphase Coating for CMCs," Ceram. Eng. Sci. Proc.,17 [4] (1996) pp. 250–257; and, K. K. Chawla, M. K. Ferber and Z. R. Xu, "Interface Engineering in Alumina-Glass Composite," Mat. Sci. Eng. A., 162, (1993) pp. 35–44.

Still other approaches that have been used to extend the service life of CFCCs consist in using low-viscosity outer protective coatings or matrix additives to heal matrix cracks, and while some of these concepts might alleviate the lack of environmental stability of the fiber/matrix interface, they do not altogether solve it. Furthermore, matrix crack healing may be undesirable in filtration applications since it would be detrimental for the permeability characteristics of the filter material.

In view of the above, a need has existed in the art for an interfacial coating that will provide protection from oxidation in the occurrence of matrix cracking.

OBJECTS AND SUMMARY OF THE PRESENT INVENTION

It is an object of the present invention to provide a multifunctional and multilayered interfacial coating for a ceramic composite wherein the material selected for the interfacial coating remains stable with both the fiber and the matrix of the composite at high temperature and for the life of the component.

Another object of the present invention is to provide a new interfacial coating that will provide for the composite a mechanism for matrix crack deflection resulting in fiber debonding and giber pullout so that an exceptionally durable composite is provided.

It is a still further object of the present invention to protect the fiber of a composite both during fabrication and during service of the component.

A still further object of the present invention is to provide an interfacial coating that is thermochemically stable with the fiber, the matrix and the service environment.

Yet a further object of the present invention is to provide an interfacial coating comprising adjacent layers of different materials wherein material mismatch between adjacent layers is selected so as to cause preferential crack deflection and debonding to occur at the multilayer interface rather than at the fiber or the matrix of the composite.

A further object of the present invention is to provide a multifunctional, multilayered interfacial coating for application as a fiber/matrix interphase of the composite and which will retard oxidation of the fiber and matrix in the interfacial zone and promote crack deflection along the low toughness interfaces extending between a central layer and an adjacent layer of the interfacial coating or even within the central layer of the interfacial coating.

In summary, the present invention is directed to a multilayered interfacial coating adapted to protect the fiber and matrix of a ceramic composite from long-term oxidation and also deflect matrix cracks and debonding to a low toughness interface region of the coating, the low toughness interface region extending either within an interior layer of the interfacial coating or between the interior layer and an adjacent layer, the interior layer being a compound that is thermodynamically stable with the compound comprising the adjacent layer and having a coefficient of thermal expansion that is different than that of the compound comprising the adjacent layer or otherwise adapted to undergo a different phase transformation when thermally cycled than the compound comprising the adjacent layer.

These and other objects will become apparent from the following description of the invention taken together with the drawings and claims.

DETAILED DESCRIPTION OF THE INVENTION

Figure 1:
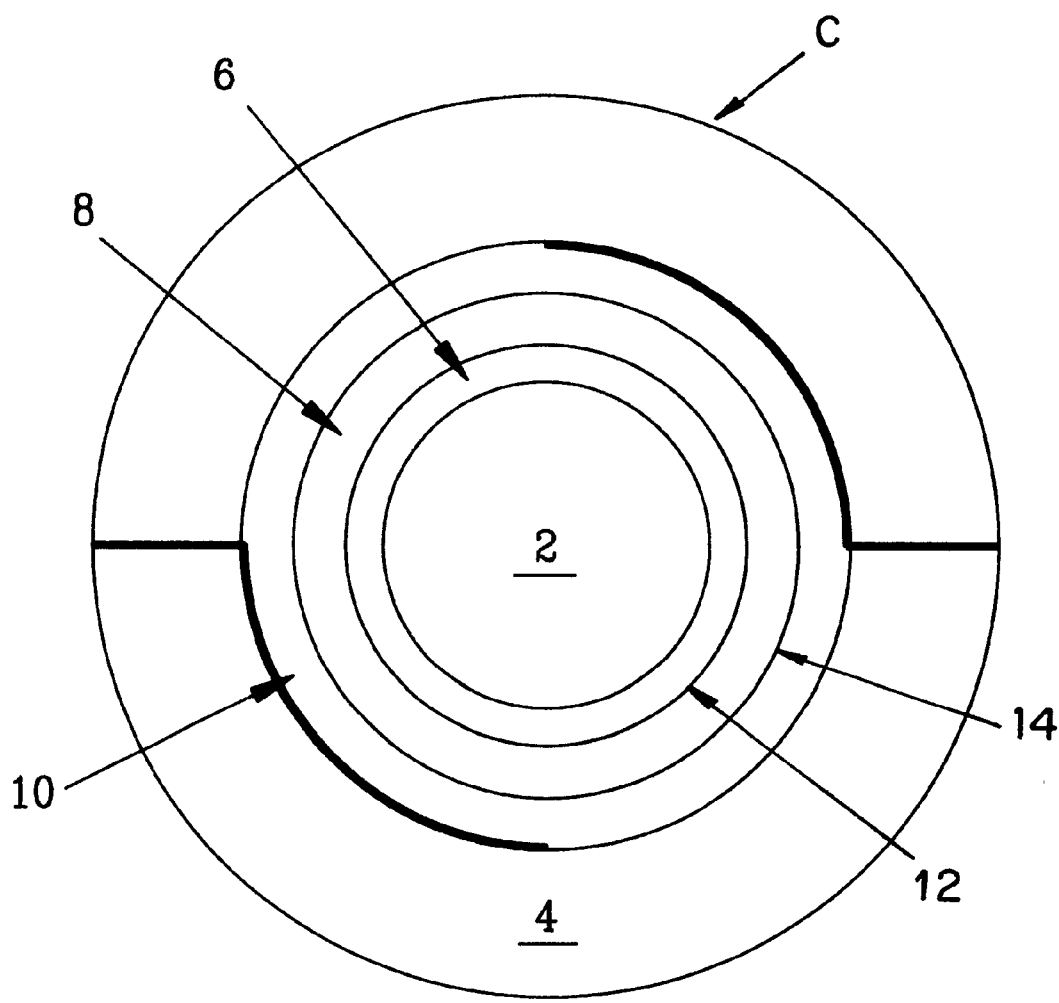
FIG. 1 is a conceptual representation of the interfacial coating of the present invention within a fiber-reinforced ceramic matrix composite.

As best shown in FIG. 1, the multilayered interfacial coating according to the present invention comprises at least three oxide interface layers disposed within a fiber-reinforced ceramic matrix composite C. Additional oxide interface layers are within the scope of the present invention. FIG. 1 is therefore illustrative of a three layer embodiment of the interfacial coating of the present invention.

As is known, the fiber-reinforced ceramic matrix composite C will comprise fibers 2 and a matrix 4 and in the present case both the fiber and the matrix are SiC-based. It is of course within the present invention to use other ceramic materials for the fiber and the matrix.

The interfacial coating comprises layers 6 and 10 which are in contact with the fiber 2 and the matrix 4 respectively. In the present example, where both the fiber and the matrix are SiC-based, it is preferred layers 6 and 10 are formed of oxide compounds that are thermochemically stable with the fiber and the matrix respectively. The purpose of these layers is to retard oxidation of the fibers and matrix within the interfacial zone formed by the various layers of the interfacial coating. Representative compounds for these layers include, but are not limited to, compounds of silica ($SiO_2$), alumina ($Al_2O_3$), zirconia (ZrO2), yttria ($Y_2O_3$), hafnia ($HfO_2$), and/or combinations of the above compounds, such as, for example, mullite.

Returning to FIG. 1, a third or central layer 8 of the interfacial coating is shown disposed between each of layers 6 and 10. As can be appreciated, although only one central layer is shown, it is within the scope of the present invention to provide additional central layers. Central layer 8 is formed from a material selected so as to promote matrix crack deflection either within central layer 8 or along low-toughness interfaces 12 and 14 formed between central layer 8 and adjacent outer layers 10 and inner layer 6 respectively thereby insuring the fibers and the matrix remain protected from the environment in the interfacial zone.

The above mechanism for promoting matrix crack deflection is best achieved by selecting a compound for the central layer or layers that is thermodynamically stable with respect to the next adjacent layer and has a coefficient of thermal expansion different than the next adjacent layer or otherwise undergoes a phase transformation when thermically cycled. In other words, there is significant material mismatch of thermoelastic properties between the adjacent layers so as to promote preferential crack deflection and debonding of the multilayer interfaces either within the central layer or along the earlier described low toughness interfaces 12 and 14 located between the central and outer layers.

Figure 2:
FIG. 2 is an electron micrograph image of a prior art interfacial coating showing matrix crack deflection at the fiber surface.

The present invention therefore differs significantly from prior art interface technology wherein deflection of the matrix cracks occurs at the surface of the fibers. FIG. 2 is a scanning electron micrograph illustrating prior art matrix crack deflection occurring at the fiber surface in a Hi-Nicalon/SiC composite with a ZrO2 fiber coating.

Representative compounds for the central layer include, but are not limited to, compounds of silica ($SiO_2$), alumina ($Al_2O_3$), zirconia ($ZrO_2$), yttria ($Y_2O_3$), hafnia ($HfO_2$), and/or combinations of the above compounds, such as, for example, mullite. In a preferred embodiment of the present invention, significant material mismatch between the layers is achieved for purposes of promoting preferential crack deflection and debonding of the multilayer interfaces as well providing good thermochemical stability at high temperatures if layer 6 is amorphous $SiO_2$, layer 8 is monoclinic $ZrO_2$ and layer 10 is amorphous $SiO_2$.

The present invention and the method for producing the present invention will best be understood from the following example.

EXAMPLE

SiC/SiC minicomposites were prepared and provided with three separate oxide interface layers utilizing significant material mismatch of thermoelastic properties between adjacent layers so as to provide preferential crack deflection and debonding of the multilayer interfaces between the layers. The present example is described in *J. Am. Ceram. Soc.*, 81 [3] 717–20 (1998), which is incorporated herein by reference.

In this example, $SiO_2$/$ZrO_2$/$SiO_2$ was selected for the multilayer interphase and infiltrated into a SiC fiber tow (Hi-Nicalon™, Nippon Carbon, Japan) using a small hot-wall chemical vapor deposition (CVD) reactor by gas switching from $SiCl_4$ to $ZrCl_4$ to $SiCl_4$ with $CO_2$ and $H_2$ as a source of oxygen. The reactor was operated at a temperature of 1050° C. and a pressure of 10 kPa. The main features of the CVD reactor are described in M. A. Borst, W. Y. Lee, Y. Zhang, and P. K. Liaw., "Preparation and Characterization of Chemically Vapor Deposited $ZrO_2$ Coating on Nickel and Ceramic Fiber Substrates." *J. Am. Ceram. Soc.*, 80[6] 1591–94 (1997) which is incorporated herein by reference, except for the following modifications. An $Al_2O_3$ tube (5.0 cm inside diameter and 61 cm in length, Vesuvius McDanel, Beaver Falls, Pa.) was used as the reactor chamber. A coaxial, two-path gas injector was used to feed $SiCl_4$ through the outer path while the inner path was packed with small Zr wire pieces for chlorination with HCl. The chlorination region of the reactor was heated to 600° C. using a resistance heater. The $ZrCl_4$ flow rate was estimated by assuming complete reaction of Zr with the HCl flow through the chorinator. The flow rate of $SiCl_4$ (99.999%, Aldrich, Milwaukee, Wis.), which is a liquid at room temperature, was controlled using a vapor source controller (Source V, Tylan General, Torrance, Calif.). The rate of air leaks into the reactor, which was found to be an important processing parameter for controlling the microstructural quality of oxide CVD coatings, was typically measured to be on the order of ~0.2 Pa/min at a reactor pressure of 1 Pa.

Four Hi-Nicalon fiber tows (~7.5 cm long) were placed in the reactor using an alumina holder in the direction parallel to the gas flow. After the deposition of the multilayered oxide coating, the alumina holder was transferred into another CVD reactor for SiC matrix infiltration without removing the fiber tow from the holder. The SiC matrix was infiltrated at 900–950° C. for 8 h using $SiCl_3CH_3$ and $H_2$ precursors at a pressure of 0.7 kPa. The experimental configuration and procedures used for the SiC infiltration were those as described in E. R. Kupp, E. Lara-Curzio, D. P. Stinton, R. A. Lowden, and T. M. Besmann, "CVI Processing of Minicomposites for Evaluation of Interface Coating Materials in Composites": in *Proceedings of the 14th International Conference on Chemical Vapor Deposition*, The Electrochemical Society, Pennington, N.J. (in press), which is incorporated herein by reference.

For tensile tests, the ends of the minicomposite specimens were imbedded in aluminum blind rivets using epoxy. The tensile tests were conducted using an in-house developed machine at a constant loading rate of 1 µm/s. Self-aligning couplers were incorporated into the load train to minimize spurious bending loading. Fracture surfaces were characterized by scanning electron microscopy (SEM, Hitachi S-800). A transmission electron microscope (TEM, Hitachi HF2000) equipped with a field emission gun (<1.5 nm probe size) and an energy dispersive spectrometer (EDS) was used to characterize the structure and composition of the multilayered oxide interphase region before and after oxidation.

Figure 3:
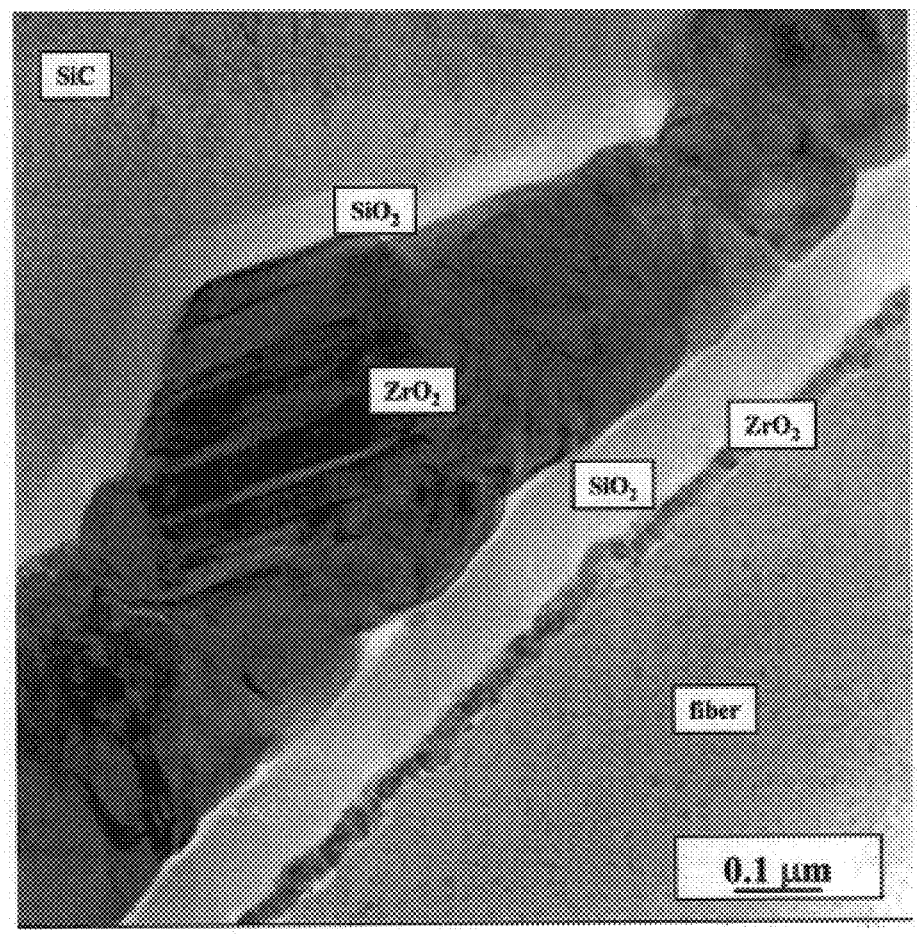
FIG. 3 is an electron micrograph image of a multilayered oxide interphase according the present invention.

FIG. 3 is a TEM image of the multilayered oxide interphase region of one of the minicomposite specimens prepared above and shows the presence of the amorphous $SiO_2$, monoclinic $ZrO_2$, and amorphous $SiO_2$ layers. A thin layer enriched with Zr (~30 nm) was observed adjacent to the fiber surface. It appears as if a small amount of residual $ZrCl_4$ in the chlorinator may have been transported to the fiber surface during the initial heating sequence and just before deposition of the first $SiO_2$ layer resulting in this relatively minor contamination layer. The average thickness of the first CVD $SiO_2$ layer was ~100 nm. whereas the second CVD $SiO_2$ layer was ~50 nm thick. The $ZrO_2$ layer was ~200 to 400 nm thick, depending on axial location. The thickness of the multilayered oxide interphase was relatively uniform in the radial direction of the fiber tow, but was not uniform along the length of the specimens because of reagent depletion along the direction of gas flow. In particular, the thickness of the $SiO_2$ layers tended to decrease along the flow direction in the range of ~50 to 200 nm. The $ZrO_2$ layer had a rough growth morphology. Consequently, the inner $SiO_2/ZrO_2$ interface was relatively smooth while the outer $ZrO_2/SiO_2$ interface was highly irregular and interlocked. Otherwise, the multilayered interphase region in its as-prepared conditions was mostly free of impurities or microcracks.

Figure 4:
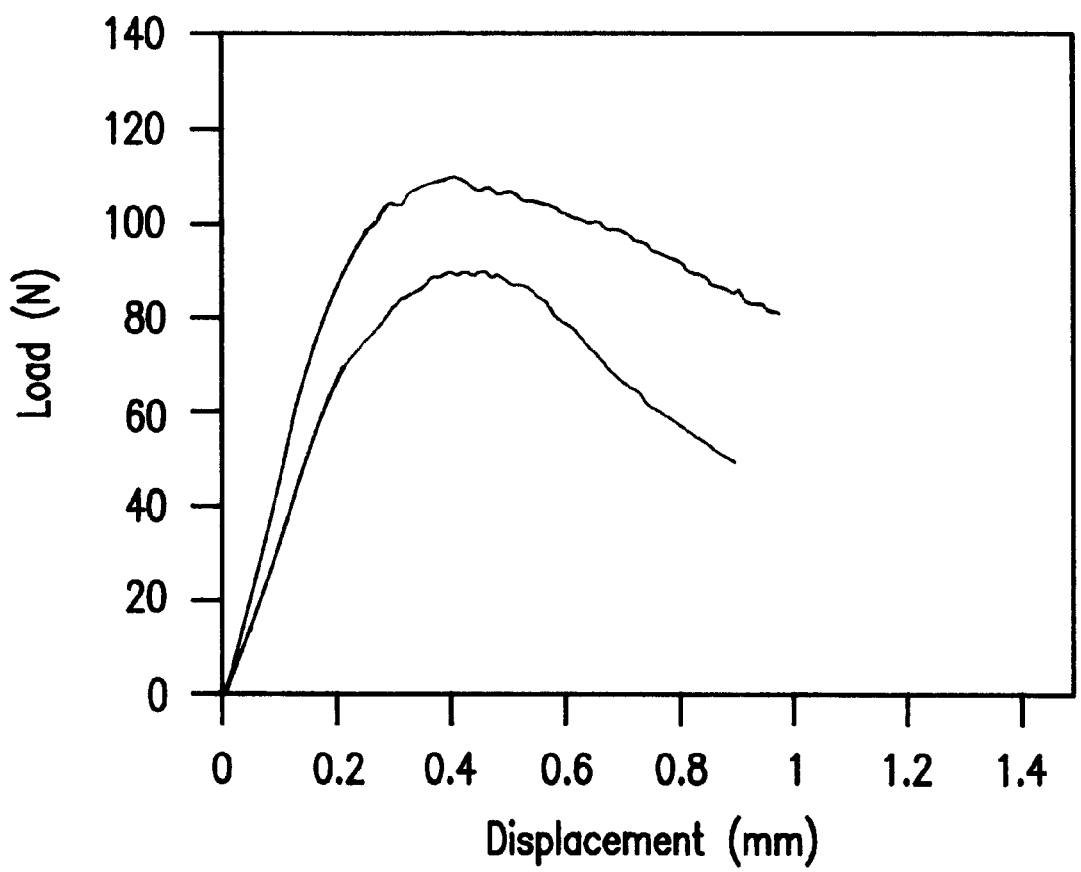
FIG. 4 is a graph showing load-displacement curves of two minicomposites prepared according to the present invention.

FIG. 4 shows the load-displacement curves of the two as-prepared minicomposite specimens. Both specimens exhibited graceful composite behavior with evidence of multiple matrix cracking. The specimens remained in one piece when the tensile tests were stopped after a total displacement of 1 mm. The maximum loads observed for these specimens, 90 and 110N, compared favorably to those of Nicalon/SiC minicomposites containing a carbon interphase coating previously prepared and discussed in E. R. Kupp, E. Lara-Curzio, D. P. Stinton, R. A. Lowden, and T. M. Besmann, "CVI Processing of Minicomposites for Evaluation of Interface Coating Materials in Composites": in *Proceedings of the 14th International Conference on Chemical Vapor Deposition* and incorporated herein by reference.

Figure 5A:
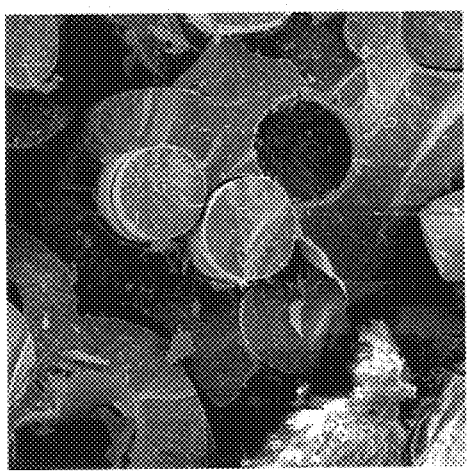
FIGS. 5A and 5B are electron micrograph images showing the fracture surface of two tensile specimens prepared according to the present invention.
Figure 5B:
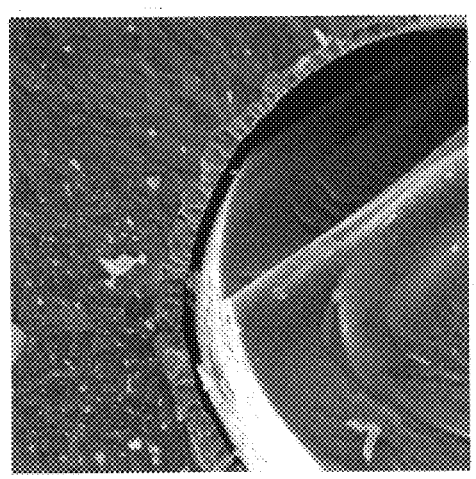

The fracture surface of the tensile specimens is shown in FIGS. 5A and 5B. Significant crack deflection was observed within the multilayer interphase region. Although exact deflection locations were difficult to determine, crack deflection and fiber pull-out occurred preferentially at the inner $SiO_2/ZrO_2$ interface. The average length of fiber pull-out was on the order of tens of micrometers.

Figure 6:
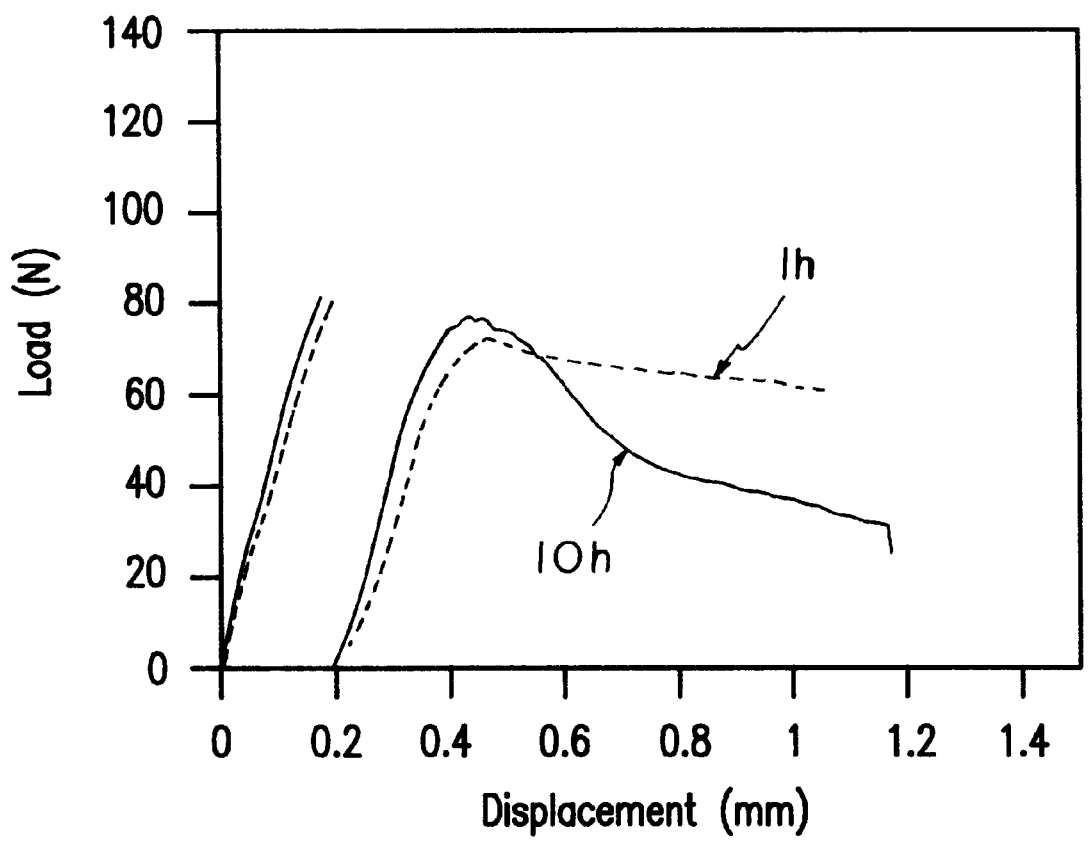
FIG. 6 is a graph showing the tensile behavior of minicomposites prepared according to the present invention that were precracked at room temperature and exposed to oxidation.

In order to assess the effects of oxidation on the mechanical behavior of the prepared minicomposites, the two specimens were loaded to 80 N to induce matrix cracking. The precracked specimens were then removed from the tensile machine and exposed to ambient air at 960° C. for 1 and 10 h using a small furnace. After the oxidation treatments, the specimens were retested. As best shown in FIG. 6, the specimens continued to exhibit composite behavior following oxidation treatments although maximum load capability (~80 N) was somewhat decreased in comparison to the as-prepared specimens. The curvature of the tail end of the load-displacement curves become steeper with longer oxidation treatment.

Figure 7A:
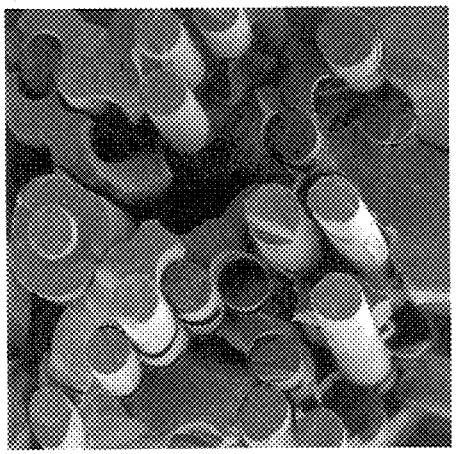
FIGS. 7A and 7B are electron micrograph images of minicomposite specimens prepared according to the present invention following oxidation and a tensile test.
Figure 7B:

The SEM fracture surfaces and TEM image of the specimen exposed to the 10 h oxidation treatment are best shown in FIGS. 7A and 7B. Crack deflection primarily occurred at the inner $SiO_2/ZrO_2$ interface, and to a lesser extent, at the outer $ZrO_2/SiO_2$ interface. The preferred location for fiber pull-out remained the inner $SiO_2/ZrO_2$ interface.

Figure 8:
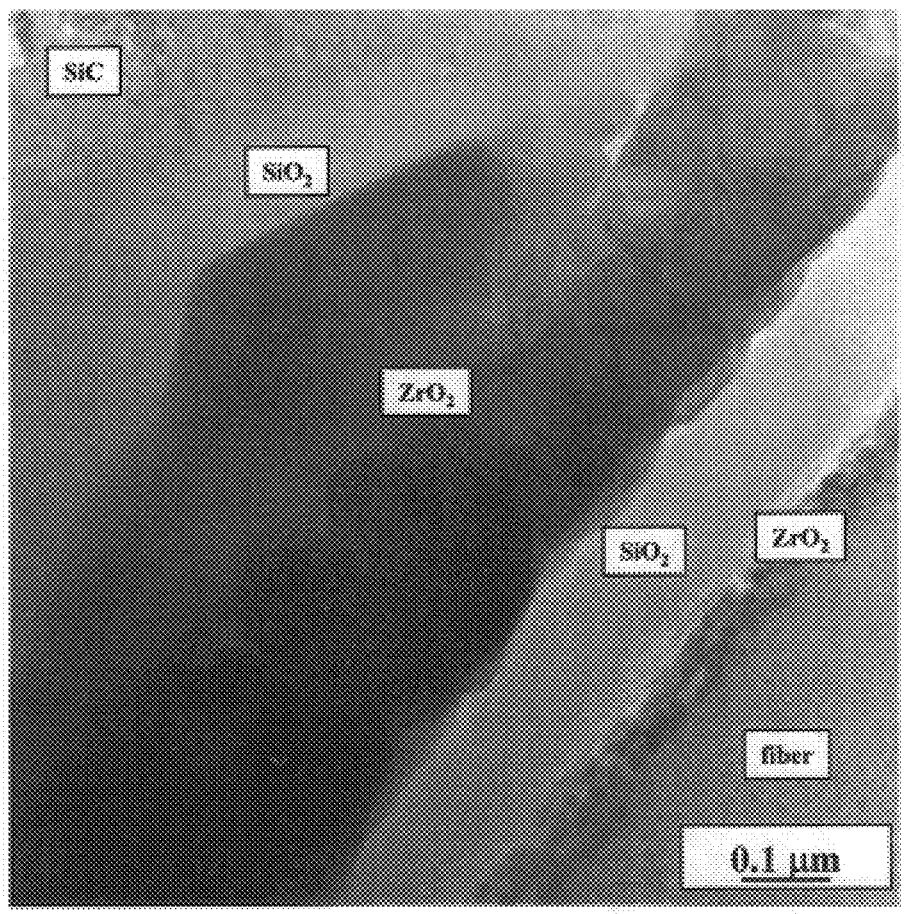
FIG. 8 is an electron micrograph image of a minicomposite specimen prepared according to the present invention showing the multilayered oxide interphase.

For at least 8 h of SiC infiltration at 900–950° C. and 10 h of oxidation treatment at 960° C., the $SiO_2/ZrO_2/SiO_2$ interphase according to the present invention exhibited excellent chemical stability as evidenced by the preservation of their sharp interface boundaries best shown in FIG. 8. No diffusion of Si and Zr within the multilayered structure, and no carbon as an impurity phase in the interphase region, was observed within the detection limits of EDS.

The above evidences good mechanical behavior and oxidation resistance for minicomposites containing the multilayered oxide interphase coatings according to the present invention. The significant coefficient of thermal expansion (CTE) mismatch between $ZrO_2$ (~10.5×10$^{-6}$ K$^{-1}$ for polycrystalline monoclinic at 1300 K) and $SiO_2$ (~0.5×10$^{-6}$ K$^{-1}$ for fused silica at 1300 k) results in the development of extreme residual strains and consequent "weakening" of their interfaces. At the deposition conditions used in the present example, amorphous $SiO_2$ is deposited with typical nodular surface morphology. Conversely, $ZrO_2$ is polycrystalline, and tended to grow in a columnar fashion. These differences in growth characteristics, the outer $ZrO_2/SiO_2$ interface being much more irregular and interlocked than the inner $SiO_2/ZrO_2$ interface, are believed to be at least partly responsible for the observed fiber pull-out behavior which occurred at the inner $SiO_2/ZrO_2$ interface and may further be attributed to the fact that there is less resistance to debonding and sliding at this smoother interface. It is further noted the observed fiber pull-out behavior may also be aided by the presence of the amorphous $SiO_2$ layer, a relatively compliant layer having a relatively low elastic modulus of 74 GPa.

The present invention permits designing and tailoring of the interface behavior for a ceramic-matrix composites with many possible materials combinations as long as sufficient thermochemical stability and thermoelastic property mismatch exist between the constituent layers is provided. The use of the $SiO_2/ZrO_2$ combination for crack deflection and fiber pull-out, while protecting the Hi-Nicalon fiber surface from long-term oxidation with the $SiO_2$ layer, provides a multiple interphase functionality. Further, the method for preparing a composite according to the present invention offers the simplicity of multilayered coatings based upon single component oxides and is therefore economically desirable from a manufacturing standpoint, As noted above, the various layers can be applied using chemical vapor deposition but other deposition is within the scope of this invention. The preferred thickness for each layer in contact with the fiber and matrix as well as the thickness of the central layers together with each layers oxygen permeability, will determine as a first approximation, the time scale associated with the life of the component.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

We claim:

1. A ceramic matrix composite comprising:
   a) a non-oxide ceramic fiber core;
   b) at least a first oxidation-resistant interface coating on said ceramic fiber core;
   c) at least a second interface coating on said at least a first oxidative-resistant interface coating;
   d) at least a third oxidation-resistant interface coating on said at least a second interface coating, said at least a second interface coating is a compound having a coefficient of thermal expansion greater than at least one of said at least a first oxidation-resistant interface coating and said at least a third oxidation-resistant interface coating;

e) a ceramic matrix shell on said at least third oxidation-resistant interface coating such that matrix crack deflection is provided within said at least a second interface coating or between any two of said at least a first, second or third interface coatings.

2. A ceramic matrix composite as in claim 1 and wherein:
a) said at least first oxidation-resistant interface coating, at least a second interface coating, and at least third oxidative-resistant interface coating comprise a material selected from the group consisting of silica, zirconia, yttria, alumina, mullite, hafnia and compounds thereof.

3. A ceramic matrix composite as in claim 1 and wherein:
a) said at least first and third oxidation-resistant interface coatings are amorphous $SiO_2$, and said at least second interface coating is monoclinic $ZrO_2$.

4. A ceramic matrix composite as in claim 1 and wherein:
a) said at least second interface coating is thermodynamically stable with said at least a first and second oxidative-resistant interface coatings.

5. A ceramic matrix composite as in claim 1 and wherein:
a) said at least second interface coating undergoes a phase transformation when thermally cycled.

6. A ceramic matrix composite comprising:
a) a non-oxide ceramic fiber core;
b) a multilayer interfacial coating on said ceramic fiber core, said multilayer interfacial coating comprising an interior layer of a first material and exterior layers thereon of a second material; and,
c) a ceramic matrix shell disposed on said multilayer interfacial coating, said first material is a compound that retards oxidation of said fiber core and said matrix shell and said second material is a compound which has a coefficient of thermal expansion greater than said first material or is a compound which undergoes phase transformation when thermally cycled thereby promoting at least one of crack deflection between said interior layer and said exterior layers or within said interior layer.

7. A ceramic matrix composite as in claim 6 and wherein:
a) said second material is thermodynamically stable with respect to said first material.

8. A ceramic matrix composite as in claim 6 and wherein:
a) said first and second materials selected from the group consisting of oxides of silica, zirconia, yttria, alumina, mullite, hafnium and compounds and mixtures thereof.

9. An interfacial coating for a ceramic matrix composite having a non-oxide ceramic fiber core and a ceramic matrix shell, said interfacial coating comprising:
a) at least a first layer on said non-oxide ceramic fiber core, said at least a first layer having a selected thermoelastic property;
b) at least a second layer on said at least a first layer, said at least a second layer having a selected thermoelastic property; and,
c) at least a third layer on said at least a second layer said at least a third layer having a selected thermoelastic property, said at least a second layer having a thermoelastic property mismatched from at least one of said at least a first layer and said at least a third layer so that at least one of preferential matrix crack deflection or debonding are caused to occur at said at least a second layer thereby insuring the fibers and matrix of a composite are protected from oxidation.

10. An interfacial coating for a ceramic matrix as in claim 9 and wherein:
a) said at least a first layer, at least a second layer and said at least a third layer are selected from the group consisting of silica, zirconia, yttria, alumina, mullite, hafnia and compounds and mixtures thereof.

11. An interfacial coating for a ceramic matrix as in claim 9 and wherein:
a) said at least a second layer has a coefficient of thermal expansion greater than at least one of said at least a first layer and said at least a third layer.

12. An interfacial coating for a ceramic matrix as in claim 9 and wherein:
a) said at least a second layer undergoes a phase transformation when thermally cycled.

13. An interfacial coating for a ceramic matrix as in claim 9 and wherein:
a) said at least a second layer is thermodynamically stable with respect to said at least one of said at least a first layer and said at least a third layer.

* * * * *